The United States Patent Office
3,351,612
Patented Nov. 7, 1967

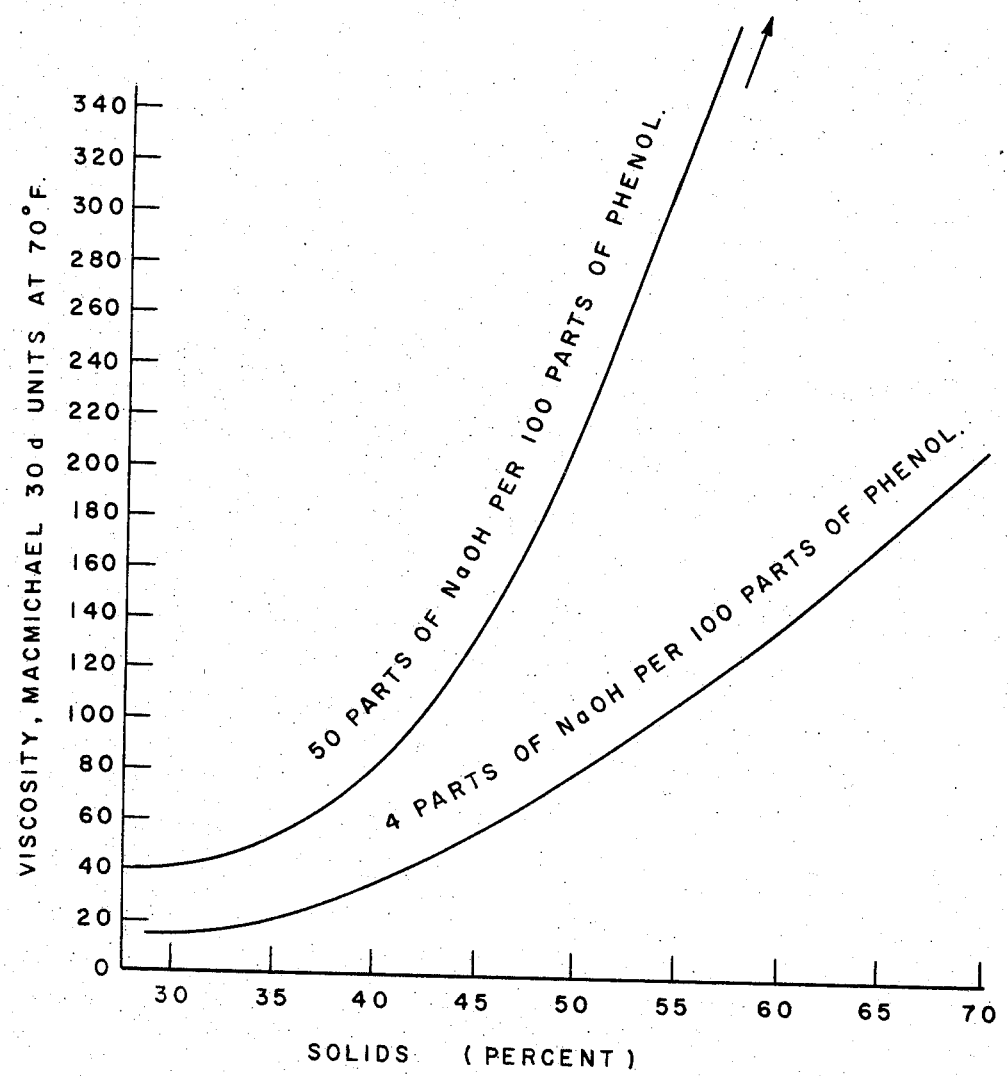

3,351,612
CONDENSATION PRODUCTS OF PHENOL, POLY-
CYCLIC PHENOLS AND FORMALDEHYDE
Gordon E. Brown, Seattle, Charlton R. Cox, Bellevue
and George Anthony Kennar, Seattle, Wash., assignors
to Monsanto Company, a corporation of Delaware
Filed Oct. 1, 1962, Ser. No. 227,406
The portion of the term of the patent subsequent to
Oct. 16, 1979, has been disclaimed
3 Claims. (Cl. 260—57)

This invention is a continuation-in-part of that claimed in copending application Ser. No. 762,205, filed Sept. 22, 1958, and relates to liquid phenolic resins particularly adapted for use as plywood adhesives and binders for hardboard and chipboard.

Liquid phenol-formaldehyde resins have enjoyed considerable success as plywood adhesives and as binders for hardwood and chipboard. However, their use in these end products has been limited due to the need for careful and accurate control of the processes to prevent over-penetration into the wood particles or plywood veneers.

One object of this invention is to provide new liquid phenolic resins.

A further object is to provide liquid phenolic resins particularly suitable for use as plywood adhesives and binders for hardboard and chipboard.

These and other objects are attained by condensing phenol with formaldehyde and a phenylphenol or mixture of phenylphenols; the formaldehyde being added in at least two stages or increments, with from about 40 to 60% of the total formaldehyde employed being charged in the first stage or increment and the liquid resin being advanced during said first stage to an end-point within the area between the two curves shown in FIGURE I.

The following examples are given in illustration of the products and processes of this invention. Where parts are mentioned, they are parts by weight.

Example I

Mix 100 parts of phenol with 6 parts of a mixture of phenylphenols obtained from vanillin still bottoms, 95 parts of formalin (37% formaldehyde) and 16 parts of 50% aqueous sodium hydroxide. Heat the mixture at 210° F. for ¾ to 1 hour to a viscosity of 45–65 on the MacMichael 30d at 70° F. At this point the liquid resin contains about 55% solids. Add 76 parts of formalin and continue the reaction at 180° F. to a viscosity of 35 on the MacMichael 26d at 70° F. The product is a liquid phenolic resin comprising an aqueous alkaline solution of a co-condensation product of phenol-formaldehyde and the phenylphenol mixture and contains about 45% solids.

A particle or chipboard is prepared by blending the liquid resin with wood particles and a small amount e.g., 0.5 to 3% by weight, based on the particles, of a hydrocarbon wax. The blend is then pressed at 250–350° F. and a pressure of 2–300 p.s.i. The board may be cured while under pressure or it may be removed after partial curing and the curing may be completed in a hot stack or oven. The chipboard thus prepared has a specific gravity of 0.65 to 0.70, a modulus of rupture of 1400 to 1800 and a water absorption of 6 to 10% by weight.

Example II

Mix 490 parts of phenol with 735 parts of a mixture of phenylphenols obtained from phenol still bottoms, 775 parts of 50% aqueous formaldehyde, 275 parts of water and 190 parts of 50% aqueous sodium hydroxide. Heat the mixture at reflux until a viscosity of about 270 on the MacMichael 30d at 70° F. is obtained. At this point the liquid resin contains about 67% solids. Add 715 parts of water, 460 parts of 50% aqueous formaldehyde and 40 parts of 50% aqueous sodium hydroxide and continue the reaction at 180° F. to a viscosity of about 30 on the MacMichael 26d at 70° F. Add another 665 parts of water and continue the reaction at 180° F. to a viscosity of about 32 on the MacMichael 26d at 70° F. Finally, another 50 parts of 50% sodium hydroxide are added and the reaction is continued at 160° F. to a viscosity of about 18 on the MacMichael 26d at 70° F. The product is a liquid phenolic resin comprising an aqueous alkaline solution of a co-condensation product of phenolformaldehyde and the phenylphenol mixture and contains about 40% solids.

A ¾" thick particle board is prepared, blending the liquid resin with wood particles and then pressing at 300° F. and a pressure of 2–300 p.s.i. for 6 minutes. The particle board thus prepared has a specific gravity of about 0.67 and a modulus of rupture of about 2050.

Example III

Mix 215 parts of phenol, 865 parts of phenol still bottoms, 695 parts of 50% aqueous formaldehyde, 170 parts of 50% aqueous sodium hydroxide and 230 parts of water. Heat the mixture at reflux for 15 minutes until a free-flowing mush containing about 70% solids is obtained. Add 680 parts of 50% aqueous formaldehyde, 1240 parts of water and 35 parts of 50% aqueous sodium hydroxide and continue the reaction at 190° F. to a viscosity of about 175 on the MacMichael 26d at 70° F. Finally, another 70 parts of 50% aqueous sodium hydroxide are added and the reaction is continued at 160° F. to a viscosity of about 18 on the MacMichael 26d at 70° F. The product is a liquid phenolic resin comprising an aqueous alkaline solution of a co-condensation product of phenol-formaldehyde and the phenylphenol mixture and contains about 40% solids.

A ¾" thick particle board is prepared, blending the liquid resin with wood particles and then pressing at 300° F. and a pressure of 2–300 p.s.i. for 5½ minutes. The particle board thus prepared has a specific gravity of about 0.66 and a modulus of rupture of about 1580.

Example IV

Mix 100 parts of phenol, 30 parts of phenol still bottoms, 105 parts of 37% aqueous formalin and 25 parts of 50% aqueous sodium hydroxide. Heat the mixture at reflux until a viscosity of about 60 on the MacMichael 30d at 70° F. is obtained. At this point the liquid resin contains about 60% solids. Add 100 parts of 37% aqueous formaldehyde and continue the reaction at 180° F. to a viscosity of 100 on the MacMichael 30d at 70° F. Finally, add another 45 parts of 37% aqueous formaldehyde and continue the reaction at 180° F. to a viscosity of 15–30 on the MacMichael 26d at 70° F. Cool rapidly. The product is a liquid phenolic resin comprising an aqueous alkaline solution of a co-condensation product of phenol-formaldehyde and the phenylphenol mixture and contains about 50% solids.

The phenylphenols of this invention are polyphenyl compounds containing at least one phenolic hydroxyl group and at least one unsubstituted ortho or para position. Compounds such as biphenyls, terphenyls, quaterphenyls, quinquophenyls, hexaphenyls, etc., containing from 1 to 4 phenolic hydroxyl groups may be substituted for the phenylphenol mixtures shown in the examples. Best results are obtained when one phenolic hydroxyl group is present for each 170–250 units of molecular weight.

The phenylphenols are rarely prepared as pure compounds but are obtained as still bottoms in the distillation purification of crude phenolic materials. The still bottoms obtained from the distillation of crude vanillin are mixtures of the phenylphenols, which mixtures typically are solids having a softening point of about 180° F. As the temperature is raised the viscosity of the melt decreases rapidly, for example, from about 10,000 centipoises at 230° F. to about 650 centipoises at 320° F. They average one phenolic hydroxyl group for 200–236 equivalent molecular weight. The still bottoms obtained from the distillation of crude phenol are somewhat harder and have slightly higher softening temperatures. A typical analysis of such still bottoms shows about 20% o-phenylphenol, about 11% p-phenylphenol with the balance being higher molecular weight phenylphenols. However, it is to be understood that the invention is not limited to vanillin or phenol still bottoms of any given composition since, of course, the crude still bottoms can vary considerably.

Even though both phenol and the still bottoms are solids, a mixture of the two is liquid at from about room temperature to about 100° F. Such a liquid may be used to prepare the resins of this invention.

From about 3 to 400 parts by weight of the phenylphenol or phenylphenol mixture are used for each 100 parts of phenol. For dry and damp process hardboard, the use of from about 3 to 100 parts of phenylphenols is preferred. For dry and damp process chipboard, the use of from about 3 to 200 parts of phenylphenols is preferred, but chipboards superior to those obtained with ureaformaldehyde resins are obtained using as much as 400 parts of phenylphenols. For plywood adhesives, from about 15 to 400 parts of phenylphenols may be used.

The total amount of formaldehyde to be used may range from about 50 to about 150 parts per 100 parts of phenol. This formaldehyde is added in two or more stages or increments; from about 40 to 60% of the total formaldehyde to be employed being added in the first stage or increment. Following this first addition of formaldehyde, the reaction is carried at a temperature of from about 180° F. to reflux to a first stage endpoint as delineated by the area between the two curves of FIGURE I. Following completion of this first stage, the remaining formaldehyde is added, either all at once, in a series of increments or continuously, and the reaction carried to completion as hereinafter described.

The formaldehyde employed is generally in the form of a commercial aqueous solution thereof, such as formalin (37% formaldehyde). However, paraform or other polymeric forms of formaldehyde may be used providing sufficient water is added to dilute the reaction components to the desired final solids content.

The catalyst used to prepare the resins of this invention is preferably sodium hydroxide. It should be used in amounts ranging from 4 to 50 parts per 100 parts of phenol. For resins to be used for particle board or dry process hardboard, not over 10 parts of sodium hydroxide should be used and all of the catalyst may be charged to the reaction vessel at the beginning of the reaction. For plywood adhesives or wet process hardboard a higher alkali content is desirable but the alkali should be added in at least three increments with suitable reaction periods between each addition. Preferably at least 50% of the total alkali is present during the first stage, the remainder being added in one or more additional increments following completion of the first stage. Other alkaline catalysts may be used in place of the sodium hydroxide; e.g., other alkaline earth or alkali metal hydroxides, oxides or salts of weak acids.

When multiple catalyst or formaldehyde additions are made, the reaction is carried, except for the first stage wherein the endpoints set forth in FIGURE I are employed, to relatively high viscosity before adding further catalyst or formaldehyde. Temperatures of from about 140° F. to reflux and more preferably from about 160 to 190° F. are employed. The endpoints are not sharp, nor are they particularly critical. The final endpoint is dependent mostly upon the particular use intended for the liquid resin and the properties desired. It is most commonly determined by measuring the viscosity of the reaction medium. Endpoints within the range of 20 to 50 on a MacMichael 26d wire at 70° F. would be most typical, but higher or lower viscosity endpoints may be determined by the practitioner to be more suitable to his purpose. The MacMichael viscosity test to be used is described in detail in U.S. Patent No. 2,437,981.

The liquid resins of this invention are aqueous alkaline solutions of co-condensation products of phenol, phenylphenols and formaldehyde containing 30–70% solids. The condensation products are in the fusible stage and may be cured to the infusible insoluble stage at temperatures above 200° F. Analysis of the liquid resin by paper chromatography indicates clearly that the phenylphenols are chemically combined.

Various conventional additives may be incorporated in the liquid resins. Among such additives are organic and inorganic particulate and fibrous fillers, colorants, lubricants, waxes, and mold resistant agents, etc.

The foregoing is given in illustration of this invention. Many variations may be made in the products and processes described without departing from the spirit and scope of the invention.

What is claimed is:

1. A process for preparing a liquid condensation product of 100 parts by weight of phenol, 50–150 parts by weight of formaldehyde and 3–400 parts by weight of at least one polycyclic phenol containing 2–6 benzene rings and having 1–4 phenolic hydroxyl groups attached to said rings, at least one of the positions ortho and para to at least one of said hydroxyl groups being unsubstituted; said process consisting of (a) combining the phenol, the polycyclic phenol, from 40 to 60% of the total formaldehyde being employed and an alkaline catalyst, (b) heating the reaction mixture thus formed to a temperature of from about 180° F. to reflux temperature until an endpoint as delineated by the area between the two curves in FIGURE I is obtained and (c) adding the remaining formaldehyde in at least one further increment while heating the reaction mixture at a temperature of from about 140° F. to reflux following the addition of each such increment; the total quantity of alkaline catalyst employed being 4–50 parts by weight, 50–100% of which is present during step (b) with, correspondingly, from 50 to zero percent being added subsequent to the completion of step (b).

2. A process as in claim 1 wherein the polycyclic phenol component is vanillin still bottoms.

3. A process as in claim 1 wherein the polycyclic phenol component is phenol still bottoms.

References Cited

UNITED STATES PATENTS 3,058,954   10/1964   Brown et al. _____ 260—51

FOREIGN PATENTS 624,115   7/1961   Canada.

WILLIAM H. SHORT, *Primary Examiner.*

V. A. MORGENSTERN, H. SCHAIN,
*Assistant Examiners.*

UNITED STATES PATENT OFFICE
CERTIFICATE OF CORRECTION

Patent No. 3,351,612                                November 7, 1967

Gordon E. Brown et al.

It is hereby certified that error appears in the above numbered patent requiring correction and that the said Letters Patent should read as corrected below.

Column 4, line 21, after "combined" insert -- in the polymer structure --; same column 4, line 53, beginning with "2. A process" strike out all to and including "still bottoms." in line 56, same column 4, and insert instead the following claims:

2. A process as in claim 1, wherein the polycyclic phenol component is vanillin still-bottoms characterized by a softening temperature of about 180° F., a melt viscosity of about 10,000 centipoise at 230° F., and a melt viscosity of about 650 centipoises at 320° F.

3. A process as in claim 1, wherein the polycyclic phenol component is phenol still-bottoms characterized by containing about 20% by weight of ortho-phenyl phenol and about 11% by weight of para-phenyl phenol.

Signed and sealed this 17th day of December 1968.

(SEAL)
Attest:

EDWARD M. FLETCHER, JR.                      EDWARD J. BRENNER
Attesting Officer                                 Commissioner of Patents